(12) United States Patent
Ko et al.

(10) Patent No.: US 10,987,797 B2
(45) Date of Patent: Apr. 27, 2021

(54) WEARABLE MUSCULAR STRENGTH ASSIST APPARATUS AND METHOD AND SYSTEM OF CONTROLLING THE SAME

(71) Applicants: HYUNDAI MOTOR COMPANY, Seoul (KR); KIA MOTORS CORPORATION, Seoul (KR)

(72) Inventors: Hun Keon Ko, Seoul (KR); Dong Jin Hyun, Suwon-si (KR); Seok Won Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 401 days.

(21) Appl. No.: 15/836,671

(22) Filed: Dec. 8, 2017

(65) Prior Publication Data
US 2019/0009405 A1   Jan. 10, 2019

(30) Foreign Application Priority Data

Jul. 4, 2017   (KR) .................. 10-2017-0084727
Aug. 10, 2017  (KR) .................. 10-2017-0101377

(51) Int. Cl.
  *B25J 9/00*    (2006.01)
  *A61H 1/02*    (2006.01)
  *A61H 1/00*    (2006.01)

(52) U.S. Cl.
  CPC ............. *B25J 9/0006* (2013.01); *A61H 1/00* (2013.01); *A61H 1/0218* (2013.01);
  (Continued)

(58) Field of Classification Search
  CPC ...... A61H 1/00; A61H 1/0218; A61H 1/0262; A61H 2201/165; A61H 2201/5061; A61H 2201/5604; A61H 2201/5609; A61H 2201/1215; A61H 2201/5007; A61H 2201/1628; A61H 2201/163; A63B 21/00178; A63B 21/00181; A63B 21/005;
  (Continued)

(56) References Cited

U.S. PATENT DOCUMENTS 9,333,109 B2 * 5/2016 Kuromiya ................. A61F 5/01
2006/0270951 A1 * 11/2006 Ikeuchi ..................... A61H 3/00
601/5

(Continued)

FOREIGN PATENT DOCUMENTS

KR    10-1589679 B1    1/2016

*Primary Examiner* — Timothy A Stanis
*Assistant Examiner* — Mayisha M Khan
(74) *Attorney, Agent, or Firm* — Slater Matsil, LLP

(57) ABSTRACT

A wearable muscular strength assist apparatus and a method and a system of controlling the same are disclosed. The wearable muscular strength assist apparatus includes a main body for supporting the upper body of a wearer, a plurality of leg pulleys provided at the left and right sides of the main body, a plurality of links, each having one end for supporting a respective one of the legs of the wearer and the remaining end connected to a respective one of the leg pulleys so as to be interlocked therewith, a plurality of wires, each being connected to a respective one of the leg pulleys, and a driving unit provided at the main body and connected with the wires in order to provide the wires with tensile force for rotating the respective leg pulleys.

20 Claims, 9 Drawing Sheets

(52) U.S. Cl.
CPC ..... *A61H 1/0262* (2013.01); *A61H 2201/165* (2013.01); *A61H 2201/5061* (2013.01); *A61H 2201/5064* (2013.01); *A61H 2201/5069* (2013.01)

(58) Field of Classification Search
CPC . A63B 21/0058; A63B 21/025; A63B 23/035; A63B 23/04; A63B 23/0405; A63B 69/24; B25J 9/0006
See application file for complete search history.

(56) References Cited

U.S. PATENT DOCUMENTS

| | | | |
|---|---|---|---|
| 2010/0094188 A1* | 4/2010 | Goffer | A61H 1/0266 602/23 |
| 2013/0131560 A1* | 5/2013 | Ferguson | A61H 3/00 601/33 |
| 2014/0330431 A1* | 11/2014 | Hollander | B25J 9/0006 700/245 |
| 2014/0378882 A1* | 12/2014 | Kazerooni | A61F 5/01 602/19 |
| 2015/0081036 A1* | 3/2015 | Nakanishi | A61H 1/024 623/24 |
| 2016/0030271 A1* | 2/2016 | Roh | A61H 1/0277 602/16 |
| 2016/0038368 A1* | 2/2016 | Lee | A61H 1/0244 623/24 |

\* cited by examiner

200(210,220)
300(310,311,320,321)
400(410,420)
700(710,720)

200(210,220)
300(310,311,320,321)
400(410,420)
700(710,720)

WEARABLE MUSCULAR STRENGTH ASSIST APPARATUS AND METHOD AND SYSTEM OF CONTROLLING THE SAME

CROSS-REFERENCE TO RELATED APPLICATION

This application claims the priority benefit of Korean Patent Application No. 10-2017-0101377 filed on Aug. 10, 2017 and Korean Patent Application No. 10-2017-0084727 filed on Jul. 4, 2017, in the Korean Intellectual Property Office, the disclosure of which is incorporated herein by reference.

BACKGROUND

1. Field

The present invention relates to a wearable muscular strength assist apparatus and a method and a system of controlling the same, and more particularly to a method of controlling a wearable muscular strength assist apparatus that is capable of assisting the waist muscular strength of a wearer by detecting the posture of the wearer.

2. Related Art

Although many kinds of working equipment have been developed, work that should be directly performed by a person or work where efficiency is increased when the work is performed by a person is still present in various industrial fields.

However, in such work, the case in which physical requirements exceed the physical limitations of a person may occur. In this case, a large number of persons may perform the work together or a small number of persons may perform the work in excess of their abilities, the efficiency of work being decreased in the former case and the risk of injury to a worker's body increasing in the latter.

The information disclosed in this Background of the Invention section is only for enhancement of understanding of general background of the invention. Applicant notes that this section may contain information available before this application. However, by providing this section, Applicant does not admit that any information contained in this section constitutes prior art.

SUMMARY

In order to solve the above mentioned problem, a wearable robot that may be directly worn by a worker and may add assist force to the movement of the worker has been developed. In the case of a wearable robot according to the related art, the entire body of the worker is enclosed with metal for the purpose of robustness and operational stability of the robot, such that a load is applied to the robot instead of to the worker.

That is, when the worker wears the robot, the robot supports the respective joints of the worker so that a load is applied to the robot instead of to the joints of the worker.

However, most wearable robots that have been developed to date are structured such that the respective joints thereof are individually driven. In such a structure, because actuators and speed reducers are required for respective joints, there is a limitation to the extent to which the weight of a wearable robot can be reduced, and manufacturing costs are high. Further, there is a problem in that it is difficult to precisely and stably control multiple actuators.

Therefore, there has been developed a wearable robot that assists the waist muscular strength of the wearer using a single actuator and a single speed reducer. Such a wearable robot for assisting the waist muscular strength needs to be controlled so as to assist the waist muscular strength of the wearer when the wearer bends or straightens the wearer's body and to prevent the wearer from feeling uncomfortable while walking.

Therefore, it is needed to detect the posture of the wearer in order to determine whether the required operating mode is a driving mode, in which a controller drives the actuator, or a walking mode, in which the controller does not drive the actuator. In order to detect the posture of the wearer, sensors for measuring the bending angle of the waist of the wearer, the angle of the hip and the like are required.

The present disclosure has been made in view of the above problems, and it is an aspect of the present invention to provide a wearable muscular strength assist apparatus and a method and a system of controlling the same, in which the posture of a wearer may be detected using the minimum number of sensors and in which tensile force generated by a driving unit may be controlled by calculating an assist torque in accordance with the detected posture of the wearer.

In accordance with an aspect of the present invention, the above and other objects can be accomplished by the provision of a wearable muscular strength assist apparatus including a main body for supporting the upper body of a wearer, a plurality of leg pulleys provided at the left and right sides of the main body, a plurality of links, each having one end for supporting a respective one of the legs of the wearer and the remaining end connected to a respective one of the leg pulleys so as to be interlocked therewith, a plurality of wires, each being connected to a respective one of the leg pulleys, and a driving unit provided at the main body and connected with the wires in order to provide the wires with tensile force for rotating the respective leg pulleys.

The main body may be equipped on the back of the wearer and may be formed so as to extend a predetermined length in the vertical direction of the upper body of the wearer and to have a shape that corresponds to the curvature of the back of the wearer so as to be in contact therewith.

The wearable muscular strength assist apparatus may further include a shoulder-fixing part pivotably coupled to the main body so as to pivot when the wearer bends or straightens the waist.

The wearable muscular strength assist apparatus may further include a plurality of connecting parts for connecting the main body to the leg pulleys, wherein the connecting parts may be located at a position corresponding to the waist of the wearer and are formed in a shape corresponding to the curvature of the waist so as to be in contact therewith.

The links may include support portions located in front of the thighs of the wearer, and the support portions may pressurize the thighs of the wearer when pulled by the wires.

The leg pulleys may be located at waist-height positions of the left and right sides of the wearer, and the driving unit may be located at a portion of the main body that corresponds to a waist-height position of the wearer.

The driving unit may unwind the wires when the wearer bends the waist and may wind the wires when the wearer straightens the waist.

The driving unit may include a motor having a rotating shaft, a harmonic gear connected to the rotating shaft, a flexspline and a circular spline, connected to the harmonic gear, and a plurality of motor pulleys, each being coupled to a respective one of the flexspline and the circular spline so as to be rotated thereby, wherein each of the wires may be connected to a corresponding one of the motor pulleys and a corresponding one of the leg pulleys.

The driving unit may not be driven while the wearer is walking and may be driven when the wearer bends or straightens the waist.

The wearable muscular strength assist apparatus may further include a sensor for sensing an inclination of the waist of the wearer and a controller for controlling operation of the driving unit so that the wires are wound or unwound when a variation in the inclination of the waist of the wearer, sensed by the sensor, is equal to or greater than a predetermined reference value.

In accordance with another aspect of the present invention, a method of controlling a wearable muscular strength assist apparatus, which includes a driving unit equipped on an upper body of a wearer, links equipped on legs of the wearer, and wires connecting the driving unit to the links and which assists waist muscular strength of the wearer using tensile force applied to the wires by operation of the driving unit, includes detecting a posture of the wearer, determining whether the driving unit needs to generate tensile force based on the detected posture of the wearer, calculating an assist torque required to assist waist muscular strength of the wearer upon entering a driving mode upon determining that the driving unit needs to generate tensile force, and controlling the driving unit so that the driving unit generates tensile force corresponding to the calculated assist torque.

In the detecting the posture of the wearer, a rotation angle of a rotation sensor provided at the driving unit may be measured, and a total bending angle may be calculated based on the measured rotation angle, the total bending angle being equal to the sum of a bending angle of the upper body of the wearer and a bending angle of the lower body of the wearer.

In the detecting the posture of the wearer, an absolute angle of an absolute angle sensor provided at the upper body of the wearer may be measured, the bending angle of the upper body of the wearer with respect to a direction perpendicular to a ground may be calculated based on the measured absolute angle, and the bending angle of the lower body of the wearer may be calculated based on the total bending angle and the bending angle of the upper body.

In the detecting the posture of the wearer, the absolute angle sensor may be an inertial measurement unit (IMU) sensor, and the bending angle of the upper body of the wearer may be calculated based on a value measured by the IMU sensor.

In the determining whether the driving unit needs to generate tensile force, when the detected posture of the wearer is bent beyond a predetermined posture, it may be determined that the driving unit needs to generate tensile force.

In the determining whether the driving unit needs to generate tensile force, when the calculated total bending angle is greater than a predetermined first angle, it may be determined that the driving unit needs to generate tensile force.

In the determining whether the driving unit needs to generate tensile force, when the calculated bending angle of the upper body is greater than a predetermined second angle or when the calculated bending angle of the lower body is greater than a predetermined third angle, it may be determined that the driving unit needs to generate tensile force.

In the calculating the assist torque, the assist torque may be calculated from the sum of a rotation torque that compensates for gravitational force applied to the upper body, a support torque resisting bending of the lower body, and a torque that assists rotation of the upper body.

In the calculating the assist torque, the assist torque may be calculated from the sum of a rotation torque that compensates for gravitational force applied to the upper body, a support torque resisting bending of the lower body, and a torque that assists rotation of the upper body, and the rotation torque that compensates for the gravitational force applied to the upper body may be calculated based on the bending angle of the upper body.

In the calculating the assist torque, the assist torque may be calculated from the sum of a rotation torque that compensates for gravitational force applied to the upper body, a support torque resisting bending of the lower body, and a torque that assists rotation of the upper body, and the support torque resisting bending of the lower body may be a value that is proportional to the bending angle of the lower body using an imaginary spring model.

In the calculating the assist torque, the assist torque may be calculated from the sum of a rotation torque that compensates for gravitational force applied to the upper body, a support torque resisting bending of the lower body, and a torque that assists rotation of the upper body, and when the bending angle of the upper body decreases, the torque that assists rotation of the upper body may be added to the assist torque, and when the bending angle of the upper body increases, the torque that assists rotation of the upper body may be subtracted from the assist torque.

The torque that assists rotation of the upper body may be a value that is proportional to a rate of change of the bending angle of the upper body.

In the calculating the assist torque, when the calculated assist torque is equal to or greater than a predetermined upper-limit value, the assist torque may be set to the predetermined upper-limit value.

The method may further include detecting the posture of the wearer again after the controlling the driving unit, and when the detected posture of the wearer is a state in which the upper body and the lower body are all straightened, the driving mode may be terminated.

The method may further include detecting the posture of the wearer again after the controlling the driving unit, and when the calculated total bending angle is 0 or less, the driving mode may be terminated.

In accordance with a further aspect of the present invention, a system of controlling a wearable muscular strength assist apparatus, which includes a driving unit equipped on an upper body of a wearer, links equipped on legs of the wearer, and wires connecting the driving unit to the links and which assists waist muscular strength of the wearer using tensile force applied to the wires by operation of the driving unit, includes a rotation sensor provided at the driving unit to measure a rotation angle, an absolute angle sensor provided at the upper body of the wearer to measure an absolute angle, and a controller for detecting the posture of the wearer based on values measured by the rotation sensor and the absolute angle sensor, determining whether the driving unit needs to generate tensile force based on the detected posture of the wearer, calculating an assist torque required to assist the muscular strength of the wearer upon entering a driving mode upon determining that the driving unit needs to generate tensile force, and controlling the driving unit so that the driving unit generates tensile force corresponding to the calculated assist torque.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
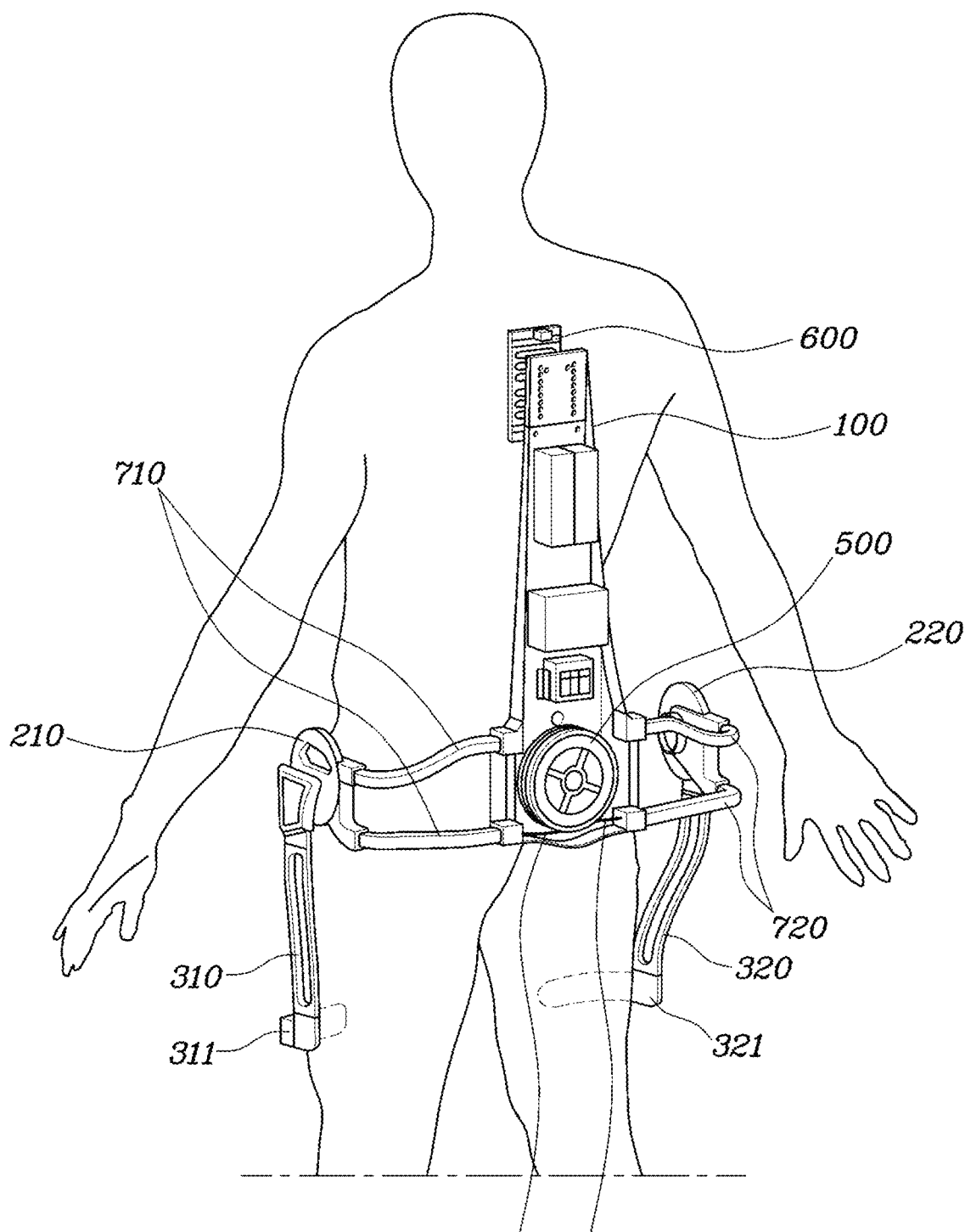
FIG. 1 is a rear perspective view of a wearable muscular strength assist apparatus according to an embodiment of the present invention when the same is worn by a wearer.

The specific structural and functional description of embodiments of the present invention, which are disclosed in the specification of the invention, is merely an exemplary description provided for the purpose of describing embodiments according to the present invention. The present invention may be embodied in many different forms and should not be construed as being limited to the embodiments set forth herein.

Since diverse variations and modifications may be applied to embodiments according to the concept of the present invention, and since embodiments of the present invention may be configured in diverse forms, a specific embodiment of the present invention will hereinafter be described in detail with reference to the examples presented in the accompanying drawings. However, it should be understood that embodiments respective to the concept of the present invention are not limited only to the specific structures disclosed herein. Therefore, it should be understood that all variations and modifications, equivalents, and replacements, which are included in the technical scope and spirit of the present invention, are included.

It will be understood that the terms "first" and "second" are used herein to describe various elements and are only used to distinguish one element from another element. Thus, a first element may be termed a second element, and similarly, a second element may be termed a first element without departing from the teachings of the present invention.

It will be understood that when an element is referred to as being "connected to" another element, it can be directly connected to the other element, or intervening elements may also be present. In contrast, when an element is referred to as being "directly connected to" another element, no intervening elements are present. Other expressions describing relationships between components, such as "between", "directly between", "adjacent to" and "directly adjacent to", may be construed similarly.

Terms used in the following description are used only to describe the specific embodiments and are not intended to restrict the present invention. The expression of singularity includes a plural meaning unless the singular expression is explicitly distinguishing based on the context. In the specification, the terms "comprising," "including," and "having" shall be understood to designate the presence of particular features, numbers, steps, operations, elements, parts, or combinations thereof, but not to preclude the presence or addition of one or more other features, numbers, steps, operations, elements, parts, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of the pertinent technology, and should not be interpreted as having ideal or excessively formal meanings unless clearly defined in the specification.

Reference will now be made in detail to the preferred embodiments of the present invention, examples of which are illustrated in the accompanying drawings. Wherever possible, the same reference numbers will be used throughout the drawings to refer to the same or like parts.

Figure 2:
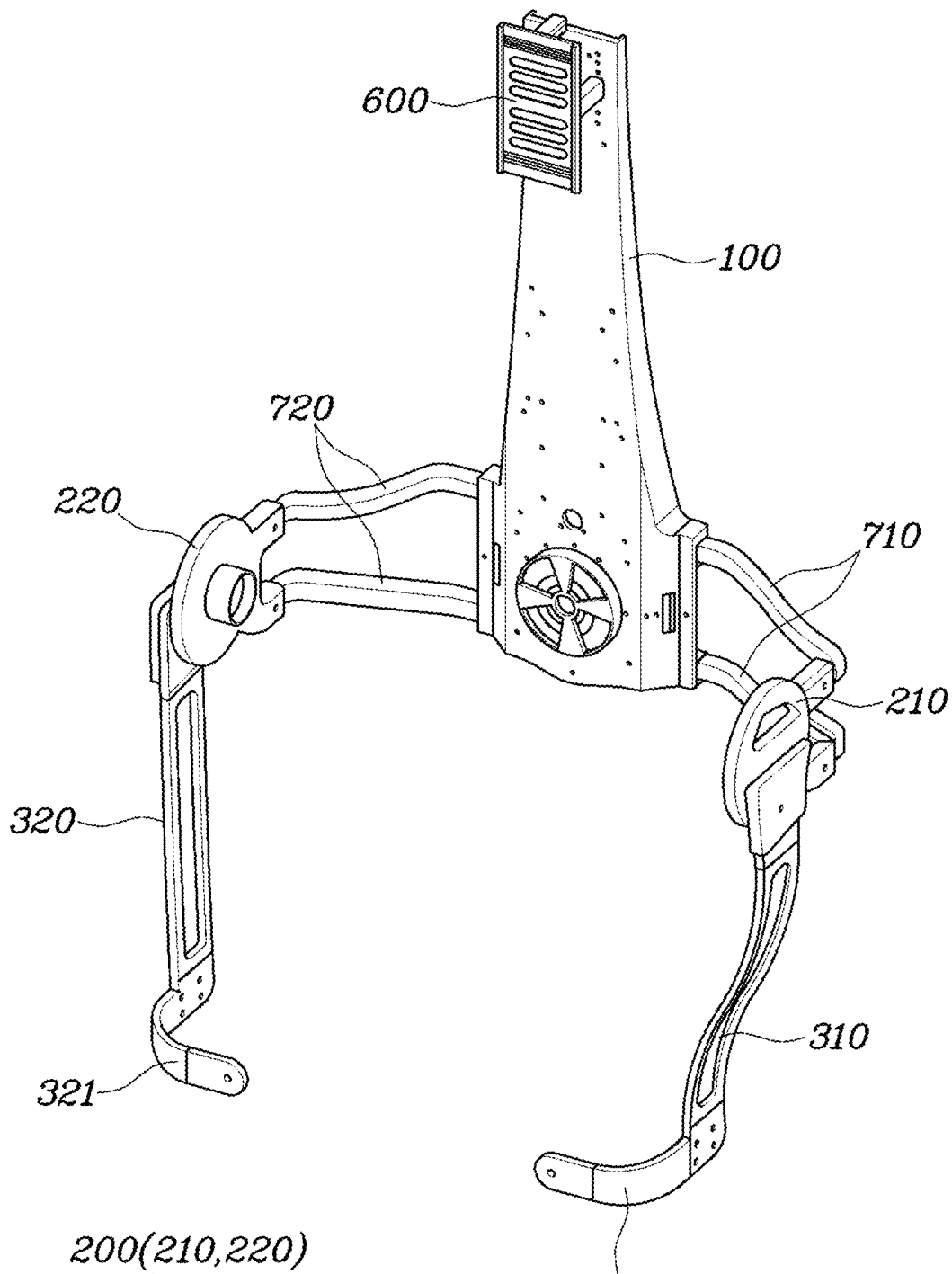
FIG. 2 is a front perspective view of the wearable muscular strength assist apparatus according to an embodiment of the present invention.

An aspect of the present invention provides a wearable exoskeleton device for assisting workers and a method for controlling the wearable exoskeleton device. In embodiments, the wearable exoskeleton device includes a first member 100 (main body) for supporting the worker's upper body (back, spine) and a second member 310, 320 for supporting the worker's leg (thigh). As illustrated in FIGS. 1 and 2, when the worker puts on the device, posture of the first member 100 represents posture of the worker's upper body (back, spine) and posture of the second member 310, 320 represents posture of the worker's lower body (thigh).

Figure 6:
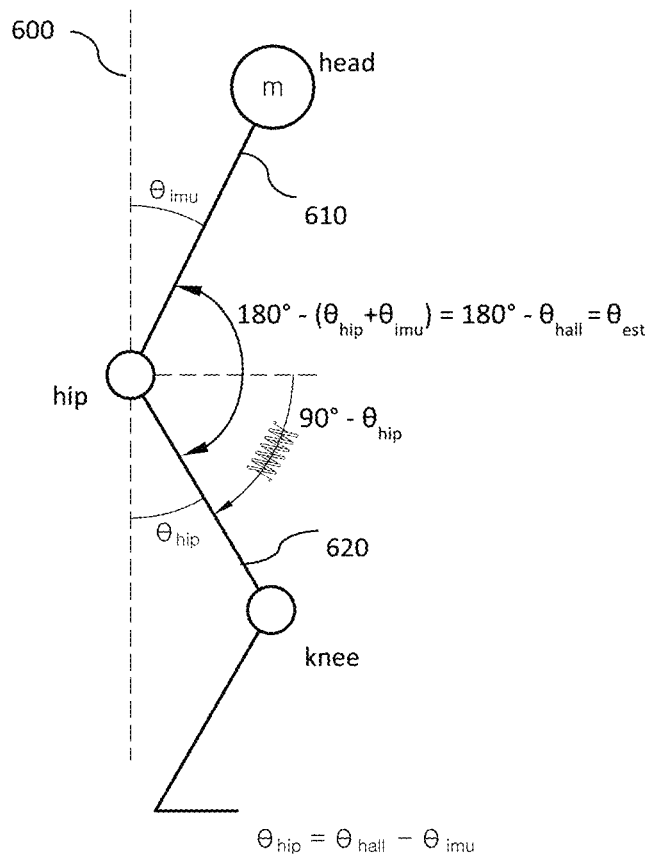
FIG. 6 is a view showing a formula for calculating an assist torque of the wearable muscular strength assist apparatus according to an embodiment of the present invention based on the posture of the wearer.

In embodiments, a controller of the wearable exoskeleton device controls using at least one of the upper body's posture (angle against a vertical direction) and the lower body's posture (angle against a vertical direction). FIG. 6 illustrates the upper body 610 and the lower body 620 when viewed from a side of the worker. In embodiments, a controller of the exoskeleton device computes an upper-body bending angle $\theta_{imu}$ of the upper body 610 against the vertical direction 600 using an inertial measurement unit (IMU) sensor that is configured to measure posture of the first member 100.

In embodiments, the controller of the exoskeleton device estimates an angle between the upper body 610 and the lower body 620 using at least one of a first rotation angle sensor installed at the at the driving unit 500 configured to measure a rotation angle of a wire driving unit and a second rotation angle sensor installed at a leg pulley 210, 220 for driving the second member 310, 320. As a wire is connecting the driving unit 500 and the leg pulley 210, 220 and angle between the first member and the second member changes according to winding/unwinding of the wire, the controller can estimate $\theta_{est}$ (angle between the upper and lower body) using at least one from a rotation angle of the leg pulley or a rotation angle of the driving unit.

Figure 3:
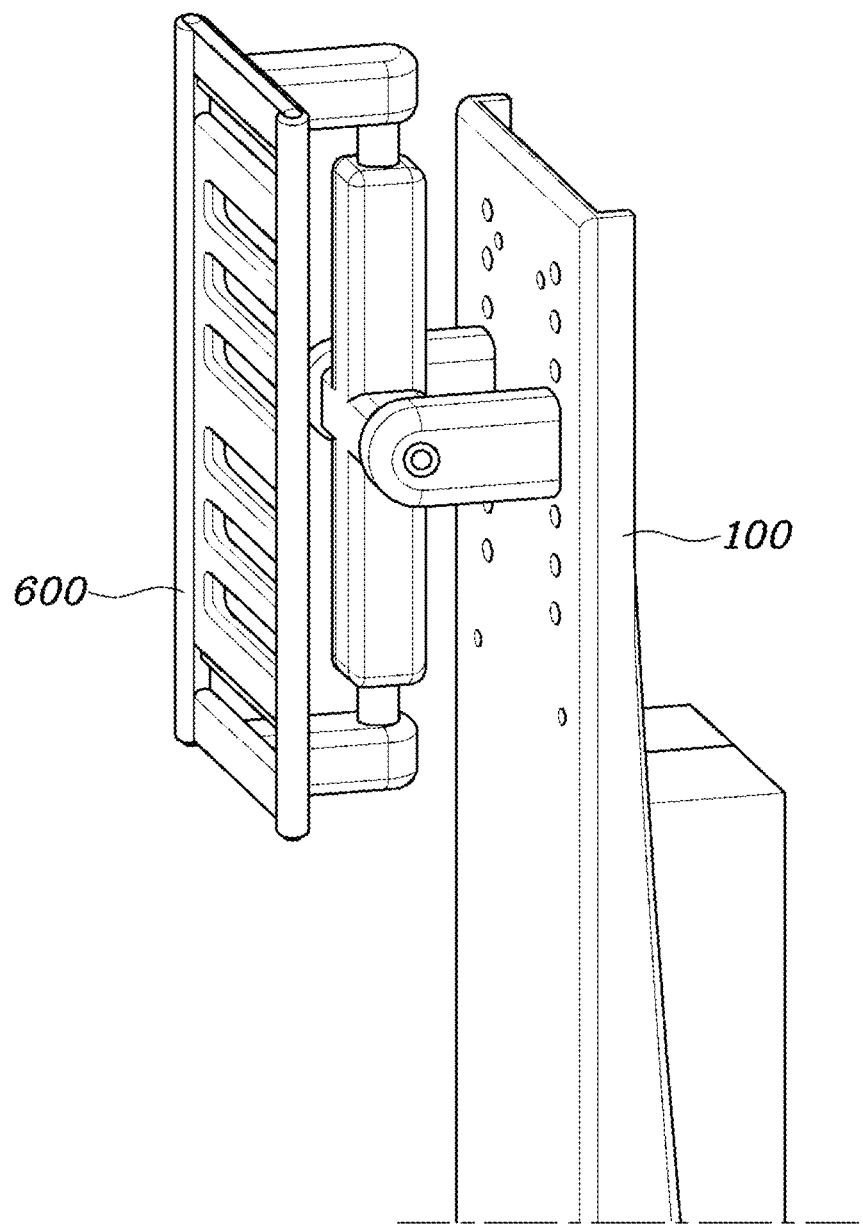
FIG. 3 is an enlarged view of a shoulder-fixing part of the wearable muscular strength assist apparatus according to an embodiment of the present invention.
Figure 4A:
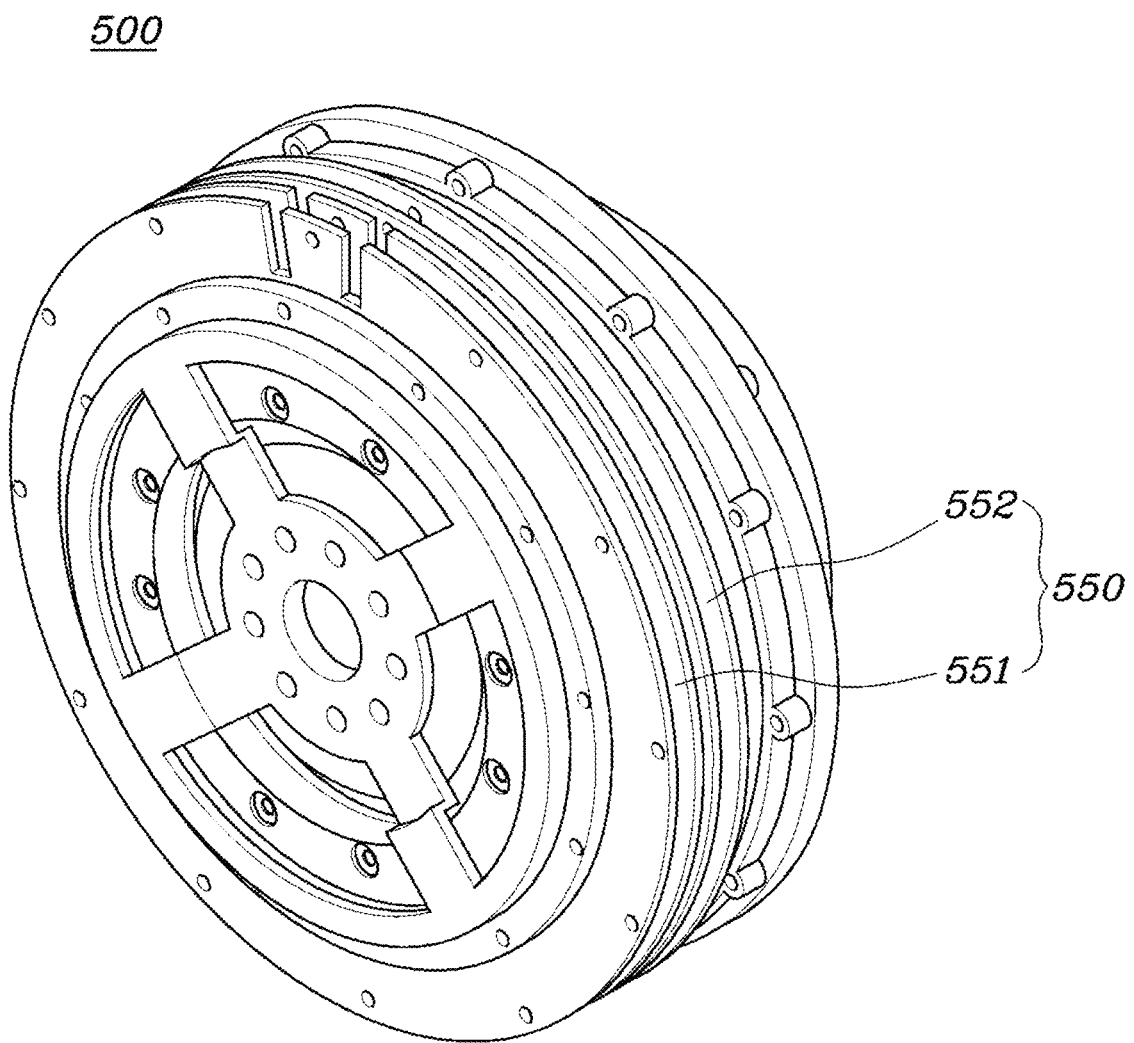
FIG. 4A is an enlarged view of a driving unit of the wearable muscular strength assist apparatus according to an embodiment of the present invention.
Figure 4B:
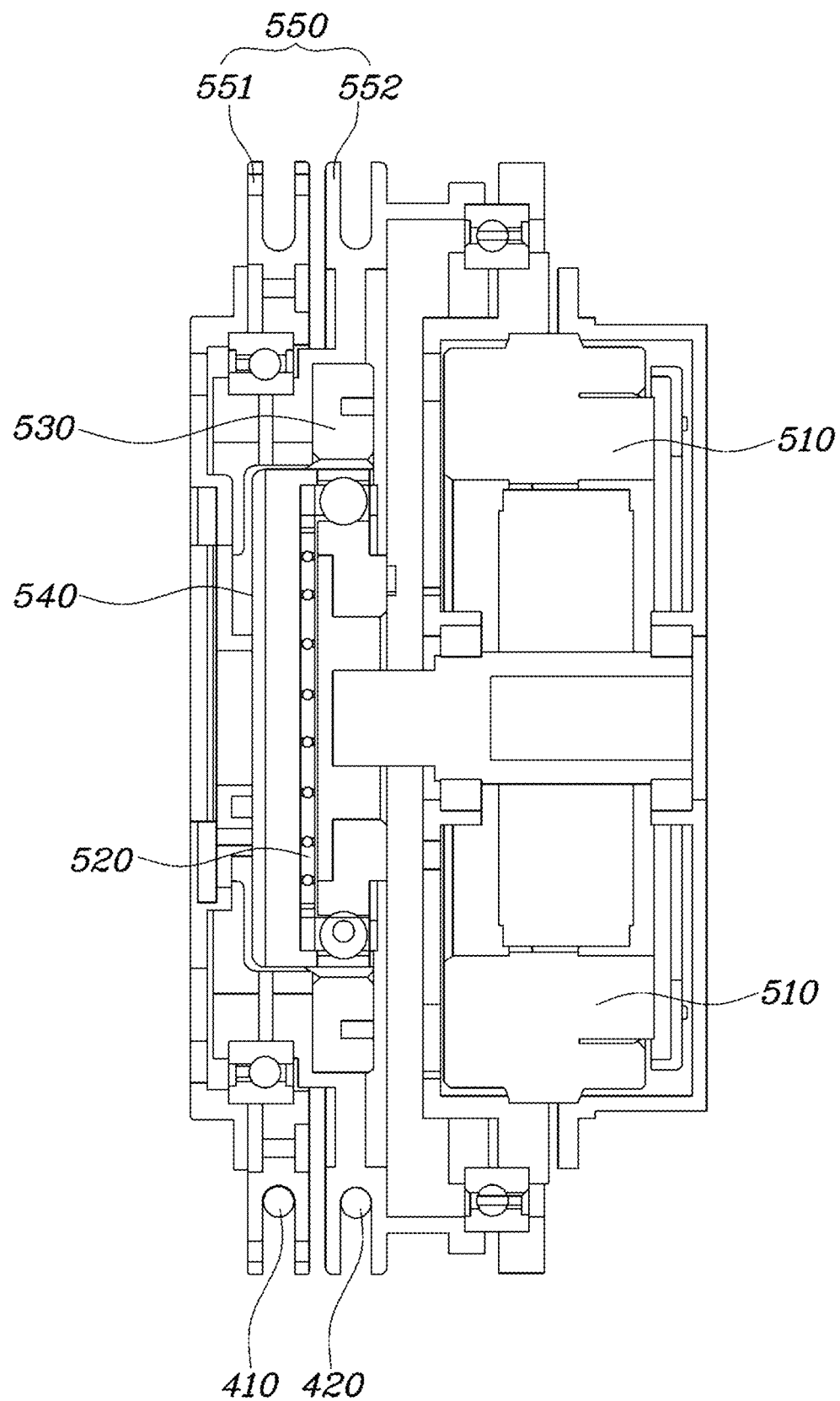
FIG. 4B is a sectional view of the driving unit of the wearable muscular strength assist apparatus according to an embodiment of the present invention.
Figure 5:
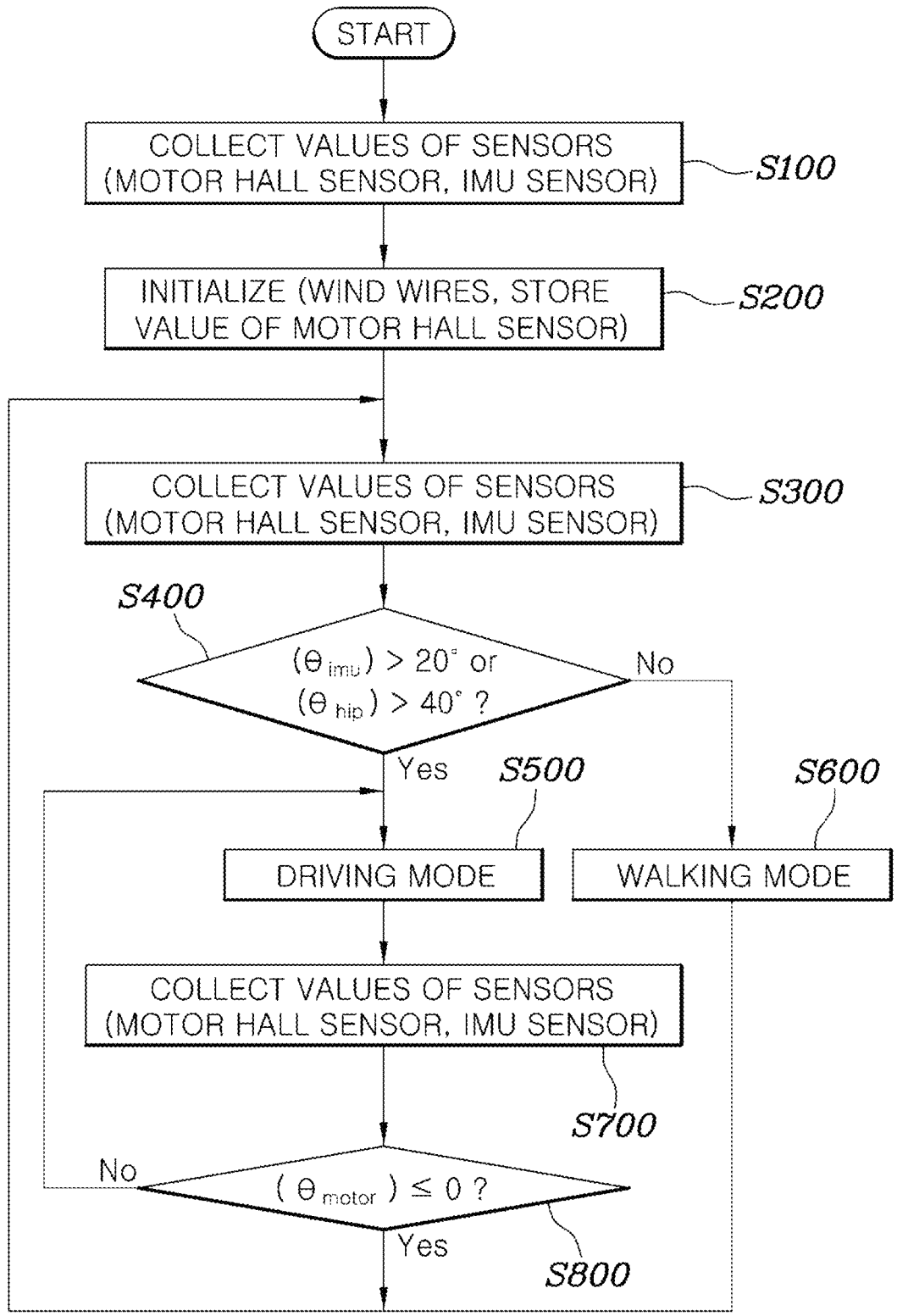
FIG. 5 is a flowchart showing a method of controlling the wearable muscular strength assist apparatus according to an embodiment of the present invention.

FIG. 1 is a rear perspective view of a wearable muscular strength assist apparatus according to an embodiment of the present invention when the same is worn by a wearer. FIG. 2 is a front perspective view of the wearable muscular strength assist apparatus according to an embodiment of the present invention. FIG. 3 is an enlarged view of a shoulder-fixing part of the wearable muscular strength assist apparatus according to an embodiment of the present invention. FIG. 4A is an enlarged view of a driving unit of the wearable muscular strength assist apparatus according to an embodiment of the present invention. FIG. 4B is a sectional view of the driving unit of the wearable muscular strength assist apparatus according to an embodiment of the present invention. FIG. 5 is a control flowchart of the wearable muscular strength assist apparatus according to an embodiment of the present invention.

Referring to FIGS. 1 and 2, the wearable muscular strength assist apparatus according to an embodiment of the present invention includes a main body 100 for supporting the upper body of the wearer, a plurality of leg pulleys 200 provided at the left and right sides of the main body 100, a plurality of links 300, each having one end for supporting a respective one of the legs of the wearer and the opposite end connected to a respective one of the leg pulleys 200 so as to be interlocked therewith, a plurality of wires 400, each being connected to a respective one of the leg pulleys 200, and a driving unit 500 provided at the main body 100 and connected with the wires 400 in order to provide the wires 400 with tensile force for rotating the respective leg pulleys 200.

The main body 100 may be equipped on the upper body of the wearer so as to support the same. It is desirable for the main body 100 to be equipped on the back of the wearer and to be formed so as to extend a predetermined length in the vertical direction of the upper body of the wearer. Specifically, the main body 100 may be equipped on the upper body of the wearer, that is, the part of the body above the waist joint about which the wearer bends or straightens the waist, and may have a shape that corresponds to a curvature of the back of the wearer so as to be in close contact therewith and consequently to support the upper body without making the wearer feel uncomfortable.

Referring to FIG. 3, the wearable muscular strength assist apparatus according to an embodiment may further include a shoulder-fixing part 600, which is pivotably coupled to the main body 100 so as to pivot when the wearer bends or straightens the waist. Specifically, the shoulder-fixing part 600 is pivotably coupled to the upper end portion of the main body 100 that is near the shoulders of the wearer. Accordingly, when the wearer bends or straightens the waist, the shoulder-fixing part 600 pivots in accordance with the change in the curvature of the waist, whereby the main body 100 is maintained in contact with the back of the wearer. The main body 100 may have a coupling-position-adjusting structure, by which the height of the shoulder-fixing part 600 coupled thereto is adjusted in accordance with the height of the wearer.

In addition, the wearable muscular strength assist apparatus may employ a harness, such as a belt, a strap or the like, which is fastened to the shoulders of the wearer. The harness may be connected to the shoulder-fixing part 600 and may be placed on the shoulders of the wearer.

The leg pulleys 200, which are provided at the left and right sides of the main body 100, may include a left leg pulley 210 and a right leg pulley 220.

The wearable muscular strength assist apparatus according to an embodiment may further include a plurality of connecting parts 700 for connecting the main body 100 to the leg pulleys 200. The connecting parts 700 may be located at a position corresponding to the waist of the wearer, and may be formed in a shape corresponding to the curvature of the waist so as to be in contact therewith. Specifically, the connecting parts 700 may include a left connecting part 710, which is connected to the left leg pulley 210, and a right connecting part 720, which is connected to the right leg pulley 220.

The connecting parts 700 are configured such that the leg pulleys 200 are rotatably connected thereto. The connecting parts 700 may be constituted by a plurality of links in order to ensure structural stability. In addition, since the connecting parts 700 are located at a position corresponding to the waist of the wearer and are formed in a shape corresponding to the curvature of the waist so as to be in contact therewith, the wearer is able to stably and comfortably bend or straighten the waist.

Each of the links 300 has one end for supporting a respective one of the legs of the wearer and the opposite end connected to a respective one of the leg pulleys 200 so as to be interlocked therewith. Specifically, the links 300 may include a left link 310, which is connected to the left leg pulley 210, and a right link 320, which is connected to the right leg pulley 220, whereby each of the links individually rotates in a manner of interlocking with the rotation of a corresponding one of the leg pulleys. However, the links 300 may be rotatably coupled to the leg pulleys 200 so as to freely rotate with respect to leftward or rightward movement of the legs of the wearer.

The links 300 include support portions 311 and 321, which are located in front of the thighs of the wearer. The support portions 311 and 321 may pressurize the thighs of the wearer when pulled by the wires 400. Specifically, the support portions 311 and 321 include a left support portion 311, which is disposed in front of the left link 310, and a right support portion 321, which is disposed in front of the right link 320. The support portions 311 and 321 may be configured to pressurize the thighs of the wearer in front of the same in order to prevent rotation of the leg pulleys 200 and the links 300 due to the pulling operation of the wires 400.

The wires 400 may be connected to the leg pulleys 200. Specifically, the wires 400 may include a left wire 410 and a right wire 420. The left wire 410 may be connected to the left leg pulley 210 through the left connecting part 710, and the right wire 420 may be connected to the right leg pulley 220 through the right connecting part 720. The left and right wires 410 and 420 may be completely or partially shielded by the left and right connecting parts 710 and 720.

The driving unit 500 may be provided at the main body 100, and may be connected with the wires 400 in order to provide the wires 400 with tensile force for rotating the respective leg pulleys 200. Specifically, the left wire 410 is connected to the left leg pulley 210 and the right wire 420 is connected to the right leg pulley 220, whereby each of the left and right leg pulleys 210 and 220 may be rotated by a pulling operation of a corresponding one of the left and right wires 410 and 420.

The driving unit 500 may be configured to unwind the wires 400 when the wearer bends the waist and to wind the wires 400 when the wearer straightens the waist.

The leg pulleys 200 may be located at waist-height positions of the left and right sides of the wearer. Specifically, the leg pulleys 200 may be located at positions that correspond to the leg joints of the wearer so as to avoid interrupting the waist-bending motion of the wearer. Further, the driving unit 500 may be located at the portion of the main body 100 that corresponds to a waist-height position of the wearer, whereby a rotational inertia load that is imposed when the wearer bends the waist decreases owing to the weight of the driving unit 500 and the distance from the leg pulleys 200 is minimized, leading to improved control responsiveness and minimization of energy loss.

Referring to FIGS. 4A and 4B, the driving unit 500 may include a motor 510 having a rotating shaft, a harmonic gear 520 connected to the rotating shaft, a flexspline 540 and a circular spline 530 connected to the harmonic gear 520, and a plurality of motor pulleys 550, each being coupled to a respective one of the flexspline 540 and the circular spline 530 so as to be rotated thereby. Each of the wires 400 may be connected to a corresponding one of the motor pulleys 550 and a corresponding one of the leg pulleys 200.

Specifically, the motor pulleys 550 may include a left motor pulley 551 and a right motor pulley 552. The left wire 410 may be connected to the left leg pulley 210 and the left motor pulley 551, and the right wire 420 may be connected to the right leg pulley 220 and the right motor pulley 552.

In one example, the flexspline 540, which is connected to the harmonic gear 520, may be coupled to the left motor pulley 551 so as to rotate the same. The circular spline 530, which is connected to the harmonic gear 520, may be coupled to the right motor pulley 552 so as to rotate the same. Alternatively, configuration may be made such that the flexspline is coupled to the right motor pulley and the circular spline is coupled to the left motor pulley.

While the wearer is walking, the operation of the driving unit 500 and the relative rotation of the left motor pulley 551 and the right motor pulley 552 do not occur, and the winding/unwinding operation of the wires 400 is repeatedly performed such that the wires 400 are wound around the left motor pulley 551 and are simultaneously unwound from the right motor pulley 552 and, conversely, are wound around the right motor pulley 552 and are simultaneously unwound from the left motor pulley 551.

When the wearer bends or straightens the waist, the driving unit 500 operates, the motor 510 having the rotating shaft rotates, the harmonic gear 520, connected to the rotating shaft, and the flexspline 540 and the circular spline 530, connected to the harmonic gear 520, also rotate, and consequently the left motor pulley 551 and the right motor pulley 552 may perform relative rotational motion so that the wires 400 may be simultaneously wound therearound or may be simultaneously unwound therefrom. The driving unit 500 may include a differential gear, whereby, when the left motor pulley and the right motor pulley have the same resistance, the force of the motor 510 may be evenly distributed thereto, or when the left motor pulley and the right motor pulley have mutually different resistances, the force of the motor 510 may be differentially distributed thereto.

The wearable muscular strength assist apparatus according to an embodiment may further include a sensor for sensing an inclination of the waist of the wearer and a controller for controlling the operation of the driving unit 500 so that the wires 400 may be wound or unwound when the variation in the inclination of the waist of the wearer, which is sensed by the sensor, is equal to or greater than a predetermined reference value.

As described above, the wearable muscular strength assist apparatus, which is controlled by the method and system according to the present invention, includes the driving unit equipped on the upper body of the wearer, the links equipped on the legs of the wearer, and the wires connecting the driving unit to the links, and assists the waist muscular strength of the wearer using the tensile force applied to the wires by the operation of the driving unit.

The main body 100 is fixed on the upper body of the wearer using a shoulder harness or a belt so as to apply force or torque in the direction in which the upper body of the wearer is straightened.

The driving unit 500, which is located at the upper body of the wearer, provides the wires 400 with tensile force so as to generate rotational force for rotating the respective leg pulleys 200. That is, rotational force is applied to the leg pulleys 200 by the tensile force of the wires 400 that is generated by the driving unit 500. Accordingly, the rotational force applied to the leg pulleys 200 pressurizes the legs of the wearer, and a torque is generated in response thereto in the direction in which the wearer straightens the upper body, thereby assisting the waist muscular strength of the wearer.

However, the driving unit 500 needs to operate to generate the tensile force of the wires 400 only when it is intended to assist the waist muscular strength of the wearer, and while the wearer is walking, the tensile force of the wires 400 needs to be minimized in order to avoid interrupting the walking of the wearer. That is, while the wearer is walking, since the wires are pulled in the same direction, the whole driving unit 500 may rotate without being driven.

FIG. 5 is a flowchart showing a method of controlling the wearable muscular strength assist apparatus according to an embodiment of the present invention.

Referring to FIG. 5, the method of controlling the wearable muscular strength assist apparatus according to an embodiment of the present invention, which includes the driving unit equipped on the upper body of the wearer, the links equipped on the legs of the wearer, and the wires connecting the driving unit to the links and which assists the waist muscular strength of the wearer using the tensile force applied to the wires by the operation of the driving unit, may include a step (S300) of detecting the posture of the wearer, a step (S400) of determining whether the driving unit needs to generate tensile force based on the detected posture of the wearer, a step of calculating an assist torque required to assist the waist muscular strength of the wearer upon entering a driving mode (S500) upon determining that the driving unit needs to generate tensile force, and a step controlling the driving unit so that the driving unit generates tensile force corresponding to the calculated assist torque.

First, when power is applied to the robot, the values of a hall sensor and an inertial measurement unit (IMU) sensor, which are provided at the driving unit of the robot, may be collected (S100). The reason for this is to judge the posture of the robot in the initial state, in which power is applied thereto.

Subsequently, an initializing step (S200) may be performed. This step may be a step for winding the wires by driving the driving unit so that the links equipped on the legs of the wearer and the driving unit may be brought into close contact with the body of the wearer. In addition, the initializing step may be a step for completely straightening the waist and the lower body of the wearer and for measuring and storing the value of the hall sensor of the driving unit at the completely straightened posture of the wearer. That is, this step functions to store an initial value that serves as a reference value for measuring an angle using the hall sensor.

FIG. 6 is a view showing a formula for calculating the assist torque of the wearable muscular strength assist apparatus according to an embodiment of the present invention based on the posture of the wearer.

Referring to FIG. 6, the step (S300) of detecting the posture of the wearer is performed to detect the degree of bending of the body of the wearer in order to determine whether the wearer is walking or needs the assist torque. In this step, a rotation angle of a rotation sensor provided at the driving unit may be measured, and a total bending angle $\theta_{hall}$, which is the sum of a bending angle of the upper body of the wearer and a bending angle of the lower body of the wearer, may be calculated based on the measured rotation angle.

Herein, the rotation sensor may be a hall sensor, which is provided at the motor of the driving unit. In the case in which a BLDC motor is used as the motor of the driving unit, a hall sensor is necessarily included therein, and it is therefore possible to detect the posture of the wearer without an additional sensor.

The total bending angle may be calculated by measuring a rotation angle of the hall sensor provided at the driving unit and comparing the measured rotation angle with the initial value. Herein, the total bending angle $\theta_{hall}$ refers to the sum of an upper-body bending angle $\theta_{imu}$ and a lower-body bending angle $\theta_{hip}$ of the wearer with respect to the state in which the wearer stands upright on the ground.

Specifically, it is possible to calculate the length of the wire, which is pulled by the bending motion of the wearer, by multiplying the rotation angle of the hall sensor by a predetermined constant, and it is also possible to calculate the total bending angle of the wearer by multiplying the pulled length of the wire by another predetermined constant. In other words, the total bending angle $\theta_{hall}$ of the wearer may be calculated based on the rotation angle of the hall sensor, or, in greater detail, may be calculated by multiplying the rotation angle of the hall sensor by a predetermined constant.

The above predetermined constant may be derived from experiments and may be varied by the distance from the center of the bending motion of the wearer to the link equipped on each leg and the distance from the center of the bending motion of the wearer to the driving unit.

In the step (S300) of detecting the posture of the wearer, an absolute angle of an absolute angle sensor, which is provided at the upper body of the wearer, may be measured, and the upper-body bending angle $\theta_{imu}$, at which the wearer bends the upper body with respect to the direction perpendicular to the ground, may be calculated based on the measured absolute angle.

The absolute angle sensor, which is provided at the upper body of the wearer, may be an inertial measurement unit (IMU) sensor, which is configured to measure an angle of inclination. Therefore, the IMU sensor may measure an angle at which the upper body of the wearer is inclined. The upper-body bending angle $\theta_{imu}$ of the wearer may be calculated based on the value measured by the IMU sensor.

The posture of the wearer may be detected by calculating the lower-body bending angle $\theta_{hip}$ of the wearer based on the total bending angle $\theta_{hall}$ and the upper-body bending angle $\theta_{imu}$. For example, as shown in the following formula, the lower-body bending angle $\theta_{hip}$ may be calculated by subtracting the upper-body bending angle $\theta_{imu}$, which is calculated through the IMU sensor, from the total bending angle $\theta_{hall}$, which is calculated through the hall sensor.

$$\theta_{hip}=\theta_{hall}-\theta_{imu}$$

Accordingly, the present invention has an effect in that both the upper-body bending angle and the lower-body bending angle may be calculated merely by adding the IMU sensor to a portion of the upper body of the wearer.

Referring back to FIG. 5, in the step (S400) of determining whether the driving unit needs to generate tensile force, when the detected posture of the wearer is bent beyond a predetermined posture, it may be determined that the driving unit needs to generate tensile force. Herein, the predetermined posture refers to a posture in which the body of the wearer is inclined from a posture of standing upright on the ground to a certain extent that still enables the wearer to move freely and naturally, namely, a posture, the inclination of which from the upright standing posture is within a predetermined threshold value.

Specifically, in the step (S400) of determining whether the driving unit needs to generate tensile force, when the calculated total bending angle $\theta_{hall}$ is greater than a predetermined first angle, it may be determined that the driving unit needs to generate tensile force.

Alternatively, in the step (S400) of determining whether the driving unit needs to generate tensile force, when the calculated upper-body bending angle $\theta_{imu}$ is greater than a predetermined second angle or when the calculated lower-body bending angle $\theta_{hip}$ is greater than a predetermined third angle, it may be determined that the driving unit needs to generate tensile force.

Herein, the first angle, the second angle and the third angle may be set to values on the basis of which a wearer's intention can be inferred and which may be prestored in a memory in the controller. For example, the second angle, which is associated with the upper-body bending angle, may be set to 20 degrees, and the third angle, which is associated with the lower-body bending angle, may be set to 40 degrees. The first angle may be set to the sum of the second angle and the third angle, e.g. 60 degrees, or may be set to another value that is unrelated to the second and third angles.

When it is determined that the driving unit does not need to generate tensile force, a walking mode (S600) may be started. In the walking mode (S600), because the wires move as the legs of the wearer move forward and backward, tensile force may make the wearer feel uncomfortable when walking. Therefore, when the walking mode is started, the controller may control the driving unit so that the driving unit further releases the wires to a certain extent, thereby preventing the wearer from feeling uncomfortable in the walking mode.

When it is determined that the driving unit needs to generate tensile force, the step of calculating an assist torque required to assist the waist muscular strength of the wearer may be performed upon entering the driving mode (S500).

Referring back to FIG. 6, in the step (S500) of calculating the assist torque, the assist torque may be calculated from the sum of a rotation torque Y, which compensates for the gravitational force applied to the upper body, a support torque Z resisting the bending of the lower body, and a torque X, which assists the rotation of the upper body.

The rotation torque Y, which compensates for the gravitational force applied to the upper body, may compensate for the rotation torque, which is generated by the angle $\theta_{imu}$, at which the upper body of the wearer is inclined with respect to the direction perpendicular to the ground, and the gravitational force mg applied to the upper body.

Specifically, the rotation torque Y, which compensates for the gravitational force applied to the upper body, may be proportional to the gravitational force applied to the upper body and the bending angle of the upper body. For example, on the assumption that the gravitational force applied to the upper body is concentrated on the crown of the head of the wearer, the rotation torque, which compensates for the gravitational force applied to the upper body, may be calculated by multiplying the gravitational force mg applied to the upper body, the length l of the upper body from the center of rotation of the wearer, and the sine of the upper-body bending angle $\theta_{imu}$. However, because the gravitational force applied to the upper body is actually not concentrated on the crown of the head, the formula for calculating the rotation torque may be more complicated.

The support torque Z resisting the bending of the lower body may be a value that is proportional to the lower-body bending angle $\theta_{hip}$ using an imaginary spring model. The imaginary spring model may be applied to the upper portion of the lower body of the wearer, as shown in FIG. 6, or may be applied to the lower portion thereof, and the calculated support torque may be proportional to the lower-body bending angle $\theta_{hip}$.

Specifically, the support torque Z resisting the bending of the lower body may be calculated by multiplying the lower-body bending angle $\theta_{hip}$ by a spring constant K. When the lower-body bending angle $\theta_{hip}$ is 0, the support torque Z resisting the bending of the lower body may also be 0. The spring constant K of the imaginary spring model is a value that may be experimentally set in accordance with the weight of the wearer and a desired responsiveness. The larger the spring constant K, the larger the support torque resisting the bending of the lower body. Because it will be apparent to those skilled in the art that when the wearer bends the lower body, the torque that supports the lower body in the direction in which the lower body is straightened increases, a detailed explanation thereof will be omitted.

Setting may be made such that when the upper-body bending angle $\theta_{imu}$ decreases, i.e. when the wearer is straightening the upper body, the torque X that assists the rotation of the upper body is added to the assist torque and such that when the upper-body bending angle $\theta_{imu}$ increases, i.e. when the wearer is bending the upper body, the torque X that assists the rotation of the upper body is subtracted from the assist torque in order to avoid interrupting the upper-body bending motion of the wearer.

That is, the torque X that assists the rotation of the upper body may be a value that is proportional to a rate of change $\omega_{imu}$ of the upper-body bending angle. The rate of change $\omega_{imu}$ of the upper-body bending angle may be calculated by differentiating the upper-body bending angle $\omega_{imu}$ with respect to time. At this time, when the rate of change $\omega_{imu}$ of the upper-body bending angle is a positive value, the torque X is subtracted from the assist torque, and when the rate of change $\omega_{imu}$ of the upper-body bending angle is a negative value, the torque X is added to the assist torque. Therefore, the torque X that assists the rotation of the upper body may be marked with a minus (−) sign and may be added to the assist torque.

In the step (S500) of calculating the assist torque, when the calculated assist torque is equal to or greater than a predetermined upper-limit value, the assist torque may be set to the predetermined upper-limit value. For example, when the calculated assist torque is equal to or greater than the upper-limit value under the condition that the upper-limit value is set to 45 Nm, the assist torque may be set to the upper-limit value, i.e. 45 Nm.

If the assist torque is too large, it may make the wearer move awkwardly or sharply, entailing the likelihood that a dangerous situation will occur. Therefore, it is necessary to set an appropriate upper-limit value in the interests of stability. The upper-limit value may be appropriately set in consideration of the body type of the wearer and responsiveness to the intention of the wearer, and may be preset in the memory of the controller.

The step of controlling the driving unit so that the driving unit generates tensile force corresponding to the calculated assist torque may be performed such that the driving unit is driven so as to wind the wires and consequently generate tensile force corresponding to the calculated assist torque. That is, the driving unit is able to generate tensile force through the operation of winding the wires so as to apply the calculated assist torque to the wearer.

Specifically, the degree to which the driving unit winds the wires so as to apply the calculated assist torque to the wearer may be varied by the distance from the center of rotation about which the upper body or the lower body of the wearer is bent to a point to which force for supporting the upper body or the lower body is applied. The degree of winding the wires may be derived from experiments, and map data related thereto may be prestored in the memory of the controller and may be used.

Referring back to FIG. 5, the method of controlling the wearable muscular strength assist apparatus according to an embodiment may further include, after the step of controlling the tensile force generated by the driving unit, a step (S700) of detecting the posture of the wearer again. When the detected posture of the wearer is a state in which the upper body and the lower body are all straightened (S800), the driving mode may be terminated. Specifically, when the calculated total bending angle of the wearer is 0 or less (S800), the driving mode is terminated. The angle $\theta_{motor}$ in FIG. 5 is equivalent to the value $\theta_{hall}$ of the hall sensor, which is provided at the driving unit. When the total bending angle $\theta_{hall}$ of the wearer becomes 0 or less, i.e. when the wearer straightens his/her body beyond a posture of standing upright on the ground, the driving mode may be terminated.

When the driving mode is terminated, the process may go back to the step (S300) of detecting the posture of the wearer and the step (S400) of determining whether to enter the driving mode or to enter the walking mode.

Figure 7:
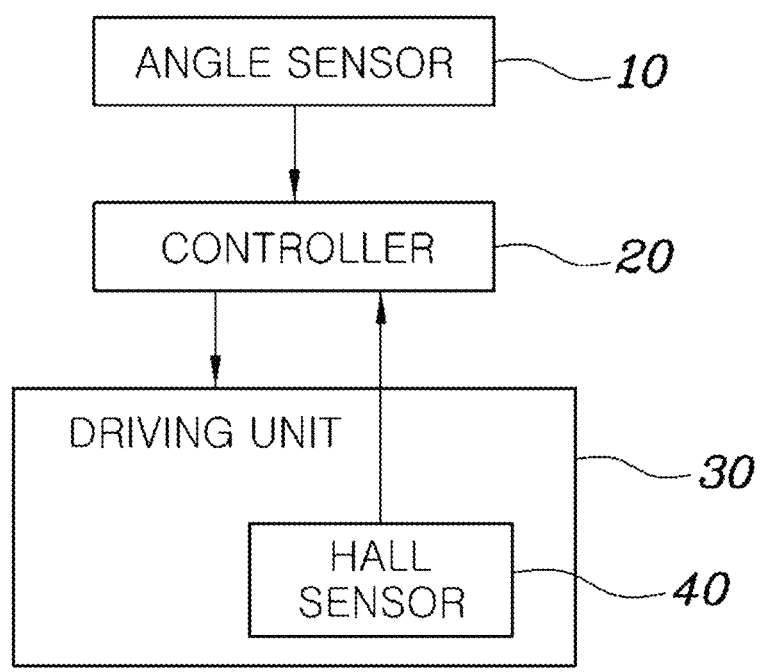
FIG. 7 is a block diagram of a control system of the wearable muscular strength assist apparatus according to an embodiment of the present invention.

FIG. 7 is a block diagram of a control system of the wearable muscular strength assist apparatus according to an embodiment of the present invention.

Referring to FIG. 7, the system of controlling the wearable muscular strength assist apparatus according to an embodiment of the present invention, which includes the driving unit equipped on the upper body of the wearer, the links equipped on the legs of the wearer, and the wires connecting the driving unit to the links and which assists the waist muscular strength of the wearer using the tensile force applied to the wires by the operation of the driving unit, may include a rotation sensor 40 provided at the driving unit 30 to measure a rotation angle, an absolute angle sensor 10 provided at the upper body of the wearer to measure an absolute angle, and a controller 20 for detecting the posture of the wearer based on the values measured by the rotation sensor 40 and the absolute angle sensor 10, determining whether the driving unit 30 needs to generate tensile force based on the detected posture of the wearer, calculating an assist torque required to assist muscular strength of the wearer upon entering the driving mode upon determining that the driving unit 30 needs to generate tensile force, and controlling the driving unit 30 so that the driving unit 30 generates tensile force corresponding to the calculated assist torque.

The absolute angle sensor 10 is provided at the upper body of the wearer and is an angle sensor that may be embodied as, for example, an IMU sensor. The rotation sensor 40 is provided at the driving unit 30 to measure a rotation angle of the motor and may be embodied as, for example, a hall sensor.

Since the operation of the control system is identical to the above-described control method, an explanation thereof will be omitted.

Figure 8:
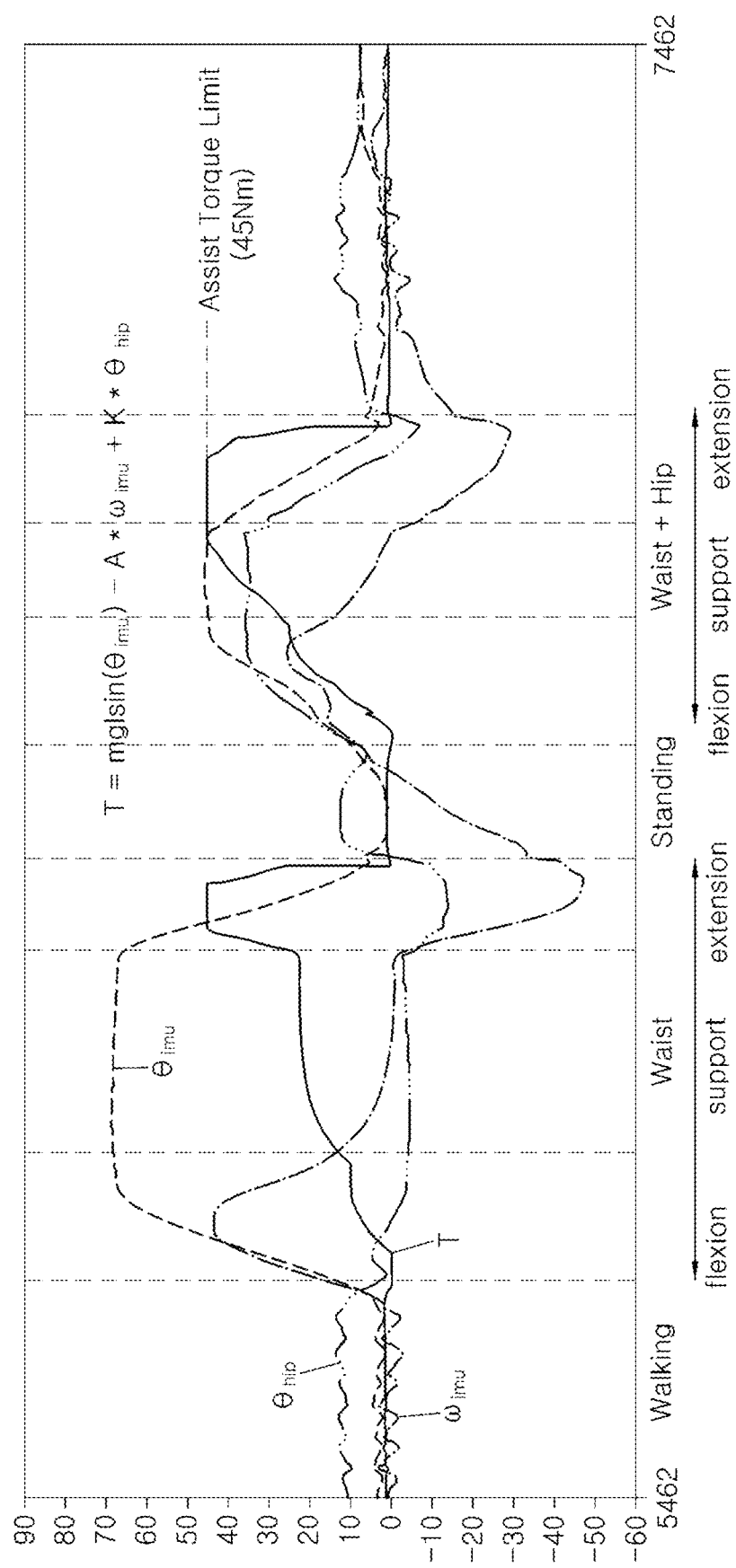
FIG. 8 is a graph showing the assist torque of the wearable muscular strength assist apparatus according to an embodiment of the present invention based on the posture of the wearer.

FIG. 8 is a graph showing the assist torque of the wearable muscular strength assist apparatus according to an embodiment of the present invention based on the posture of the wearer.

Referring to FIG. 8, in the initial section "Walking", the angles measured by the sensors fluctuate in accordance with the walking motion of the wearer. In such a walking mode, the wires may be maintained loose so as to minimize the fluctuation of $\theta_{hall}$. At this time, the assist torque may be 0.

A subsequent section "Waist" is a section in which the wearer bends and then straightens only the upper body. In the upper-body bending motion ("flexion"), the assist torque is calculated from the sum of the rotation torque that compensates for the gravitational force applied to the upper body and the torque that assists the rotation of the upper body. Herein, since the rotation of the upper body is performed in the direction in which the upper body is bent, the rate of change $\omega_{imu}$ of the upper-body bending angle is a positive value, and the torque that assists the rotation of the upper body is a negative value. Accordingly, the assist torque is decreased in order to avoid interrupting the upper-body bending motion of the wearer.

In the mode of supporting the bent upper body ("support"), the assist torque is calculated from the rotation torque that compensates for the gravitational force applied to the upper body. In the motion of straightening the upper body back ("extension"), the assist torque is calculated from the sum of the rotation torque that compensates for the gravitational force applied to the upper body and the torque that assists the rotation of the upper body. At this time, the rate of change $\omega_{imu}$ of the upper-body bending angle is a negative value, and the torque that assists the rotation of the upper body is a positive value. Accordingly, the assist torque is increased in order to assist the motion of straightening the upper body.

A subsequent section "Waist-Hip" is a section that is almost identical to the above-described section "Waist" but is different in that the support torque resisting the bending of the lower body is added to the assist torque. The support torque resisting the bending of the lower body is calculated based on the lower-body bending angle $\theta_{hip}$ and is added to the assist torque throughout the state in which the lower body is bent.

Further, the upper-limit value of the assist torque is set to 45 Nm. Even when the calculated assist torque exceeds the upper-limit value, the assist torque is maintained at the upper-limit value.

As is apparent from the above description, in a method and a system of controlling a wearable muscular strength assist apparatus according to embodiments of the present invention, it is possible to reliably detect the posture of a wearer using the minimum number of sensors, thereby reducing the weight of a wearable robot and the manufacturing costs thereof. In addition, it is possible to infer the intention of the wearer in accordance with the detected posture of the wearer and to calculate an assist torque suitable for the motion of the wearer, thereby appropriately assisting the muscular strength of the wearer and preventing the wearer from feeling uncomfortable while walking. That is, the wearable muscular strength assist apparatus is controlled so as to appropriately comply with the intention of the wearer.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although embodiments of the present invention has been disclosed for illustrative purposes, those skilled in the art will appreciate that various modifications, additions and substitutions are possible, without departing from the scope and spirit of the invention as disclosed in the original claims.

What is claimed is:

1. A wearable muscular strength assist apparatus comprising:
   a main body for supporting an upper body of a wearer;
   a plurality of leg pulleys provided at left and right sides of the main body;
   a plurality of links, each having one end for supporting a respective one of legs of the wearer and a remaining end connected to a respective one of the leg pulleys so as to be interlocked therewith;
   a plurality of wires, each being connected to a respective one of the leg pulleys; and
   a driving unit provided at the main body and connected with the wires in order to provide the wires with tensile force for respectively rotating the leg pulleys and rotating the upper body of the wearer in a bending mode and a straightening mode, wherein the driving unit comprises:
      a motor having a rotating shaft;
      a harmonic gear connected to the rotating shaft;
      a flexspline and a circular spline, connected to the harmonic gear; and
      a plurality of motor pulleys, each being coupled to a respective one of the flexspline and the circular spline so as to be rotated thereby;
   wherein each of the wires is connected to a corresponding one of the motor pulleys and a corresponding one of the leg pulleys; and
   wherein the apparatus is configured so that when a winding or unwinding operation of the wires is repeatedly performed the wires are wound around a first one of the motor pulleys and are simultaneously unwound from a second one of the motor pulleys without driving of the motor and without a relative rotation of the plurality of motor pulleys in a walking mode.

2. The wearable muscular strength assist apparatus according to claim 1, wherein the main body is configured to be equipped on a back of the wearer and is formed so as to extend a predetermined length in a vertical direction of the upper body of the wearer and to have a shape that corresponds to a curvature of the back of the wearer so as to be in contact therewith.

3. The wearable muscular strength assist apparatus according to claim 1, further comprising:
   a shoulder-fixing part pivotably coupled to the main body so as to pivot when the wearer bends or straightens a waist.

4. The wearable muscular strength assist apparatus according to claim 1, further comprising:
   a plurality of connecting parts for connecting the main body to the leg pulleys,
   wherein the connecting parts are located at a lower position of the main body and are formed in a shape corresponding to a curvature of a waist of the wearer so as to be in contact therewith.

5. The wearable muscular strength assist apparatus according to claim 1, wherein the links include support portions located at a position in front of thighs of the wearer, and wherein the support portions are configured to pressurize the thighs of the wearer when pulled by the wires.

6. The wearable muscular strength assist apparatus according to claim 1, wherein the leg pulleys are located at a position corresponding to waist-height positions of the left and right sides of the wearer, and the driving unit is located at a portion of the main body that corresponds to a waist-height position of the wearer.

7. The wearable muscular strength assist apparatus according to claim 1, further comprising:
a rotation sensor configured to sense an inclination of a waist of the wearer; and
a controller configured to control operation of the driving unit so that the driving unit is able to unwind the wires when the wearer bends the waist and wind the wires when the wearer straightens the waist.

8. A wearable muscular strength assist apparatus adapted to operate in a walking mode, a bending mode and a straightening mode, the apparatus comprising:
a main body for supporting an upper body of a wearer;
a plurality of leg pulleys provided at left and right sides of the main body;
a plurality of links, each having one end for supporting a respective one of legs of the wearer and a remaining end connected to a respective one of the leg pulleys so as to be interlocked therewith;
a plurality of wires, each being connected to a respective one of the leg pulleys;
a motor having a rotating shaft;
a harmonic gear connected to the rotating shaft;
a flexspline and a circular spline, connected to the harmonic gear; and
a plurality of motor pulleys, each being coupled to a respective one of the flexspline and the circular spline so as to be rotated thereby, wherein each of the wires is connected to a corresponding one of the motor pulleys and a corresponding one of the leg pulleys;
wherein the apparatus is configured to operate so that a winding or unwinding operation of the wires is repeatedly performed such that the wires are wound around the motor pulleys and are simultaneously unwound from the motor pulleys without driving of the motor and without a relative motion of the plurality of motor pulleys in the walking mode.

9. The wearable muscular strength assist apparatus according to claim 8, wherein the apparatus is configured to determine whether the wearer is walking or bending or straightening a waist, wherein the motor is not driven when it is determined the wearer is walking, the motor is driven when it is determined the wearer is bending the waist and the motor is driven when it is determined the wearer is straightening the waist.

10. The wearable muscular strength assist apparatus according to claim 1, further comprising:
a rotation sensor configured to sense an inclination of a waist of the wearer; and
a controller configured to control operation of the driving unit so that the wires are wound or unwound when a variation in the inclination of the waist of the wearer, sensed by the rotation sensor, is equal to or greater than a predetermined reference value.

11. A method of operating the wearable muscular strength assist apparatus according to claim 1, the method comprising:
providing the wearable muscular strength assist apparatus;
detecting a posture of the wearer;
determining whether the driving unit needs to generate tensile force based on the detected posture of the wearer;
calculating an assist torque required to assist waist muscular strength of the wearer upon entering a driving mode upon determining that the driving unit needs to generate tensile force; and
controlling the driving unit so that the driving unit generates tensile force corresponding to the calculated assist torque.

12. The method according to claim 11, wherein, in the detecting the posture of the wearer, a rotation angle of a rotation sensor provided at the driving unit is measured, and a total bending angle is calculated based on the measured rotation angle, the total bending angle being equal to a sum of a bending angle of the upper body of the wearer and a bending angle of a lower body of the wearer.

13. The method according to claim 12, wherein, in the detecting the posture of the wearer, an absolute angle of an absolute angle sensor provided at the upper body of the wearer is measured, the bending angle of the upper body of the wearer with respect to a direction perpendicular to a ground is calculated based on the measured absolute angle, and the bending angle of the lower body of the wearer is calculated based on the total bending angle and the bending angle of the upper body.

14. The method according to claim 11, wherein, in the determining whether the driving unit needs to generate tensile force, when the detected posture of the wearer is bent beyond a predetermined posture, it is determined that the driving unit needs to generate tensile force.

15. The method according to claim 13, wherein, in the determining whether the driving unit needs to generate tensile force, when the calculated bending angle of the upper body is greater than a predetermined second angle or when the calculated bending angle of the lower body is greater than a predetermined third angle, it is determined that the driving unit needs to generate tensile force.

16. The method according to claim 11, wherein, in the calculating the assist torque, the assist torque is calculated from a sum of a rotation torque that compensates for gravitational force applied to the upper body, a support torque resisting bending of the lower body, and a torque that assists rotation of the upper body.

17. The method according to claim 13, wherein, in the calculating the assist torque, the assist torque is calculated from a sum of a rotation torque that compensates for gravitational force applied to the upper body, a support torque resisting bending of the lower body, and a torque that assists rotation of the upper body, and wherein the rotation torque that compensates for the gravitational force applied to the upper body is calculated based on the bending angle of the upper body.

18. The method according to claim 13, wherein, in the calculating the assist torque, the assist torque is calculated from a sum of a rotation torque that compensates for gravitational force applied to the upper body, a support torque resisting bending of the lower body, and a torque that assists rotation of the upper body, and wherein the support torque resisting bending of the lower body is a value that is proportional to the bending angle of the lower body using an imaginary spring model.

19. The method according to claim 13, wherein, in the calculating the assist torque, the assist torque is calculated from a sum of a rotation torque that compensates for gravitational force applied to the upper body, a support torque resisting bending of the lower body, and a torque that assists rotation of the upper body, and wherein when the bending angle of the upper body decreases, the torque that assists rotation of the upper body is added to the assist torque, and when the bending angle of the upper body increases, the torque that assists rotation of the upper body is subtracted from the assist torque.

20. The wearable muscular strength assist apparatus according to claim 8, wherein the motor pulleys include a left motor pulley and a right motor pulley and wherein the apparatus is configured to operate so that the winding or unwinding operation of the wires is repeatedly performed such that the wires are wound around the left motor pulley and are simultaneously unwound from the right motor pulley and, conversely, are wound around the right motor pulley and are simultaneously unwound from the left motor pulley.

\* \* \* \* \*